July 11, 1939.  E. EGER  2,165,842
DEVICE FOR SLITTING TIRE TREADS
Filed May 15, 1936
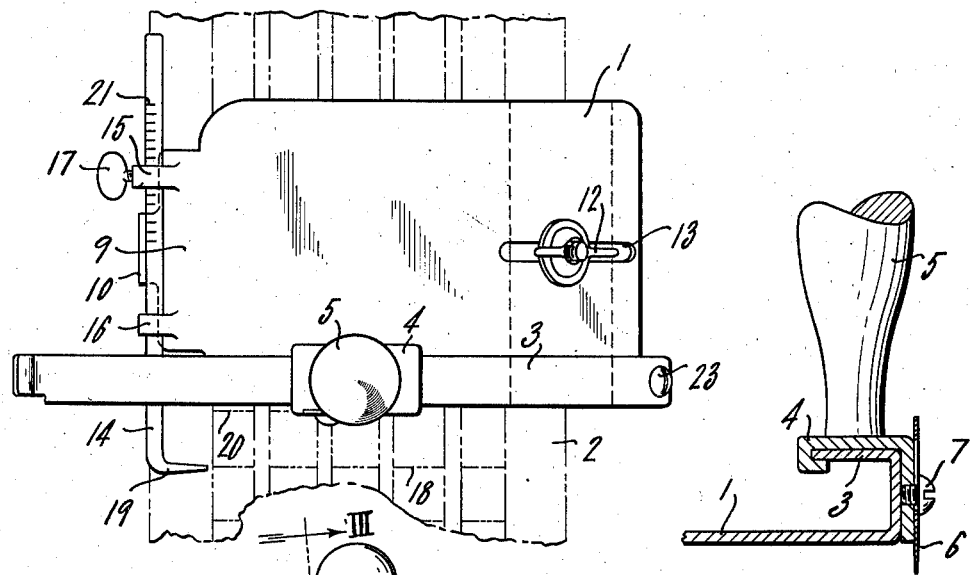
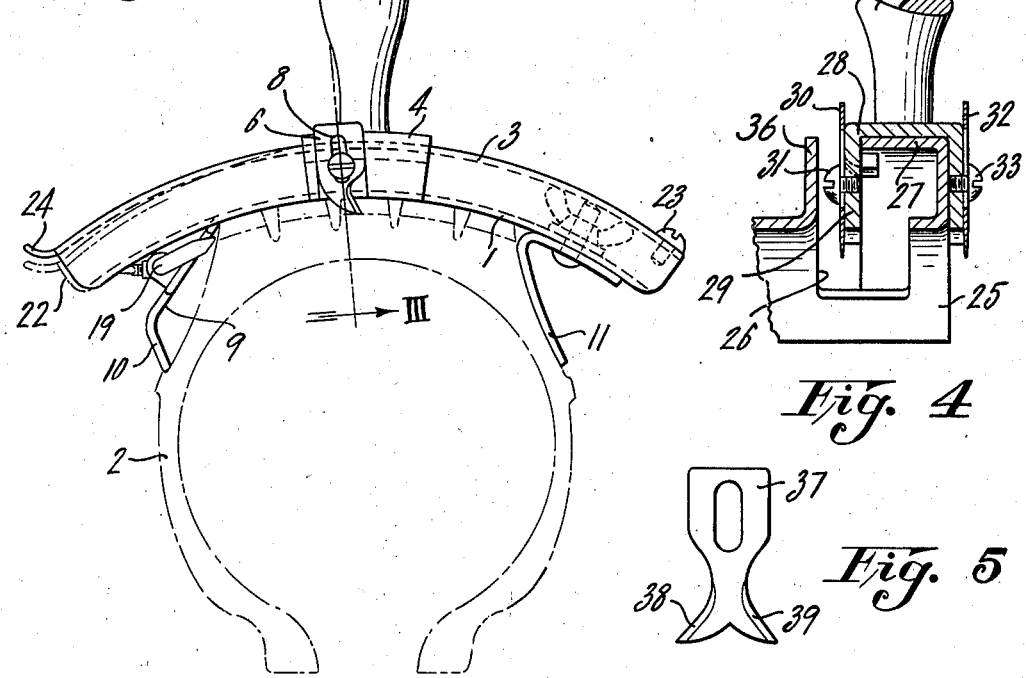
INVENTOR.
ERNST EGER
BY
ATTORNEY Patented July 11, 1939

2,165,842

UNITED STATES PATENT OFFICE 2,165,842

DEVICE FOR SLITTING TIRE TREADS

Ernst Eger, Grosse Pointe Park, Mich., assignor, by mesne assignments, to United States Rubber Company, New York, N. Y., a corporation of New Jersey Application May 15, 1936, Serial No. 79,901

14 Claims. (Cl. 164—73)

This invention relates to the slitting of pneumatic tire treads, and more particularly it relates to a hand operated device for producing the incisions in a tire tread.

It has been demonstrated that the skidding and wearing qualities of a pneumatic tire may be improved by providing a plurality of transverse slits circumferentially of the tire tread. In the manufacture of such pneumatic tires, the slits may be incorporated in the tire tread as part of the manufacturing process, or they may be applied to new or worn tires at places remote from the factory. In new tires, advantages are obtained by initially having the depths of the slits less than the full depth of the antiskid projections, and it is, therefore, advantageous to re-slit the tires after the treads have been worn down to a point where the original slitting is no longer effective.

I provide a simple, easily manufactured, and portable device for slitting either new or old tires of a single or of a range of tread curvatures, which device, in its preferred form, is characterized by a plate or base which substantially conforms to the curvature of a tire or tires on which it is to be used. A cutting knife is mounted on the plate for reciprocal movement with a cutting blade projecting beyond the base so as to form the slits in the tire tread. The base is provided with adjustable guiding means cooperating with the side walls of the tire so that the cutting knife can move transversely of the tire, or at an inclination to the central plane of the tire if it is desired that the slits shall cross the tire tread in a diagonal manner. An indicator is carried by the plate for registering with a previously cut slit in the same cutting operation, or with the root of a slit in a worn tire tread so that the spacing of new slits may be controlled. If desired, the projections of the indicator may be varied between different slits or between groups of slits so as to give regular, irregular, or group spacings to the slits on the tire tread.

The accompanying drawing illustrates certain present preferred embodiments of the invention, in which:

Fig. 1 is a plan view of my slitting device in operative position on a tire tread;

Fig. 2 is a side elevational view of the device in operative position on a pneumatic tire, the latter being illustrated in cross section by dash-and-dot lines;

Fig. 3 is a transverse view, in section, of the device, taken along lines III—III of Fig. 2;

Fig. 4 is a sectional view, similar to that shown in Fig. 3, of a modified device having a dual knife arrangement; and Fig. 5 is a side view of a modified knife having a double cutting edge.

Referring to the drawing, and in particular to Figs. 1, 2, and 3, there is shown a slitting device comprising a plate or frame 1 having a transverse curvature conforming substantially with the tread profile of a pneumatic tire 2, and the plate 1 preferably is curved slightly to conform to the circumferential curvature of the tire periphery. The curvature of plate 1 may conform to the curvature of a particular tire, or it may approximate the curvature of several tires so as to be useful therewith. As shown in Fig. 3, one end of the plate 1 is formed into an overhanging flange to provide a track 3 on which a carriage 4 is slidable. The carriage 4 is transversely formed to closely engage the outer lateral and top faces of the flange and to enclose the exposed edge of the track 3 so that the carriage is laterally secured to the track for movement therealong. A handle 5 secured to the carriage 4 provides manual means for moving the carriage along the track 3.

A relatively thin knife blade 6 is secured to the carriage 4 by means of a screw 7 in such manner as to permit the cutting edge of the blade to extend beyond the tire engaging surface of the frame 1. An elongated slot 8 in the cutting blade permits vertical adjustment of the knife and determines the depth of the slit.

At each side of the plate 1 means is provided for preventing lateral movement of the cutting device relative to the tire 2 with which it cooperates. At one side of the plate 1, a flange 9 extends downwardly therefrom and terminates in a relatively narrow projection 10 for engagement with the sidewall of the tire 2. At the opposite side of the plate 1, an adjustable flange 11 is provided and is secured to the plate 1 by means of a bolt and a wing nut 12. An elongated slot 13 in the plate 1 permits transverse adjustment of the flange 11.

It sometimes is desirable to cut slits in a tire tread in an angular direction to the central plane of the tire, as opposed to the conventional transverse arrangement of the slits. To accomplish this effect, the plate 1 may be positioned on the tire tread at the desired angle and the flange 11 may be turned the desired angle to bear against the sidewall of the tire and be secured to the plate in that relation. The flange 11, therefore, will operate as a guide in maintaining the angular direction of the slits. The relatively narrow projection 10 extending from the flange 9, because of its narrow width and because of its location on the central plane to the plate 1, operates as a pivot point for assisting in the angular adjustability of the plate 1 relative to the tire 2.

An indicator rod 14 is slidable within bosses 15 and 16 extending laterally from the flange 9 for determining the circumferential distance between succeeding slits 18. The boss 15 is provided with a thumb screw 17 for holding the indicator rod 14 in a fixed position. An inturned pointer 19 at the end of the indicator rod 14 is located close to the tread, and the slitting device may be circumferentially shifted along the tread of the tire so that the pointer 19 is in alignment with a slit 18. Thereafter, subsequent slits, such as 20, may be cut into the tread in measured spaced relation as determined by markings 21 on the indicator rod 14 cooperating with the boss 15.

As shown in Fig. 2, if desired the arcuate track indicated by dot-and-dash lines 22 may be of a different radius than the radius of the transverse curvature of the plate 1. Such a difference in curvature between the track and the plate produces a transverse slit in the tread of the tire 2, which slit is of greater depth at the shoulder portions of the tread than at the central plane of the tire.

At one end of the track 3 a stop screw 23 is provided to limit movement of the carriage 4. At the opposite end of the track a stop 24 is provided, or the indicator rod 14 may be used as a stop at that end of the track 3.

As shown in Fig. 2, the leading cutting edge of the knife 6 is at the lowermost portion of the blade in order to provide a cutting edge which, when moved transversely of the tire tread, will tend to maintain the frame or plate 1 in close engagement with the profile of the tread of the tire 2. In other words, there is no tendency on the part of the knife to raise the frame from the tire during the cutting operation.

Fig. 4 illustrates a modification of the invention in that it utilizes two knives in spaced relation, adapted to form two slits simultaneously. The frame or plate 25 is similar in all respects to the plate 1 shown in Fig. 1, except that an elongated opening 26 extends through the plate 25 for the purpose of permitting an additional knife blade to extend beneath the surface of the plate. A track 27 is similar to the track 3 shown in Figs. 1 to 3. A carriage 28 is slidable along the track 27, and includes a side flange 29 to which is secured a knife blade 30 by means of a machine screw 31 for projection through the opening 26. Directly opposite the knife blade 30 a second knife blade 32 is secured to the carriage by means of a machine screw 33. A handle 34 attached to the carriage 28 provides means for manually moving the carriage along the track 27.

In order to protect the operator from the knife blade 30, a guide flange 36 bordering the edge of the opening 26 extends outwardly from the plate 25.

The dual knife assembly as thus described enables the cutting of two independent slits simultaneously, and thus expedites the operation of slitting the tire tread.

In Fig. 5, a modified form of knife is shown. This knife 37 is provided with a dual blade having cutting edges 38 and 39. In each case the leading cutting edge of the blade is located at the lowermost portion of the blade, and from the lower part of the blade the cutting edge extends angularly back from the direction of the cut. By using a blade of this type the cutting operation is facilitated by providing a cutting effect from either a backward or forward movement of the cutter carriage.

In the operation of the cutting device the tire operated upon may be inflated or deflated, and it may be either mounted or demounted.

In applying the cutting device to a tire the operator first loosens the thumb screw 12, and positions the plate on the tread of tire in such manner that the guide projection 10 engages with the sidewall of the tire. The device is further positioned to locate the track 3 substantially in transverse or angular relation to the tire. The guide flange 11 is next placed lightly against the sidewall of the tire and the thumb screw 12 is tightened to maintain it in that position.

The operator places one hand on top of the plate 1 so as to hold the device rigidly relative to the tire and, grasping the handle 5 with the other hand, the operator with a single stroke moves the carriage transversely over the tread of the tire. Thus, a single transverse cut is produced in the tread to a depth previously determined in accordance with the vertical adjustment of the knife blade 6. The operator then moves the carriage back to its starting position, with the blade 6 sliding in the last made slit, until the blade is clear of the tire tread. He then slides the plate a short distance circumferentially backward until the pointer 19 comes into alignment with the slit made in the last cutting stroke. If desired, the markings 21 on the indicator rod 14 may be variably spaced to provide, upon successive adjustments of the rod 14, variable spacings between successive slits or any combination of variable group spacings. A pattern may be provided which the operator follows in making the adjustments. The carriage is again moved forward to produce another slit, and this operation is repeated until the entire circumference of the tire has been slit as desired.

If the tire tread has been previously slit and then worn, the pointer 19 may be positioned opposite to, or possibly even inserted into, the roots of the previous slits so as to insure that the new slits shall register with the old ones. The device is accordingly useful on new or on worn tires.

In order to facilitate the cutting operation it is preferable to apply a lubricant to the surface of the tire before the incisions are made. This lubricant may be of any conventional form such as a soap solution, or water.

While I have shown and described certain present preferred embodiments of my invention, it will be understood that modifications may be made therein within the spirit of the invention and the scope of the appended claims.

Having thus described my invention, what I claim and desire to protect by Letters Patent is:

1. In a device for slitting tire treads, the combination of a base adapted to rest upon and substantially conforming to the curvature of a portion of the tread of a pneumatic tire, a track carried by the base, a carriage slidable on the track, and a knife carried by the carriage and projecting beyond the tire engaging surface of the base.

2. In a device for slitting tire treads, the combination of a base adapted to rest upon and substantially conforming to the curvature of a portion of the tread of a pneumatic tire, a track carried by the base and extending transversely of a tire tread to which the base is applied, a carriage slidable on the track, and a knife carried by the carriage and projecting beyond the tire engaging surface of the base.

3. In a device for slitting tire treads, the combination of a base adapted to rest upon and substantially conforming to the curvature of a portion of the tread of a pneumatic tire, side flanges extending from the base for limiting transverse movement of the base relative to the tire with which it cooperates, a track connected to the base, a carriage slidable on the track, and a knife carried by the carriage and projecting beyond the tire engaging surface of the base.

4. In a device for slitting tire treads, the combination of a base adapted to rest upon and substantially conforming to the curvature of a portion of the tread of a tire, side flanges extending from the base for limiting transverse movement of the base relative to the tire with which it cooperates, means for adjusting at least one of the flanges for varying the distance between the flanges, a transversely extending track connected to the base, a carriage slidable on the track, and a knife carried by the carriage and projecting beyond the tire engaging surface of the base.

5. In a device for slitting tire treads, the combination of a base adapted to rest upon and substantially conforming to the curvature of the tread of a pneumatic tire, side flanges extending from the base for limiting its transverse movement relative to the tire with which it cooperates, means for adjusting one of the flanges for varying the angular position of the base relative to the central plane of the tire to which the device is applied, a transversely extending track carried by the base, a carriage slidable on the track, and a knife carried by the carriage and projecting beyond the tire engaging surface of the base.

6. In a device for slitting tire treads, the combination of a base adapted to rest upon and substantially conforming to the shape of the tread of a pneumatic tire, side flanges extending from the base for limiting its transverse movement relative to the tire with which it cooperates, means for adjusting one of the flanges for varying the angular position of the base relative to the central plane of the tire, the opposite flange being relatively narrow to permit the angular positioning of the base, a transversely extending track connected to the base, a carriage slidable on the track, and a knife carried by the carriage and projecting beyond the tire engaging surface of the base.

7. In a device for slitting tire treads, the combination of a base adapted to rest upon and substantially conforming to the shape of the tread of a tire, a track extending from the base, a carriage slidable on the track, and a knife carried by the carriage and projecting below the resting surface of the base, the leading cutting edge of said knife extending in forward and outward direction relative to the direction of the cutting movement whereby the cutting reaction tends to draw the base against the tire to which it is applied.

8. In a device for slitting tire treads, the combination of a base adapted to rest upon and substantially conforming to the shape of a portion of the tread of a tire, a track extending from the base, a carriage slidable on the track, and a knife carried by the carriage and projecting beyond the resting surface of the base, said knife comprising a blade having a cutting edge on opposite sides thereof and in divergent relation whereby the cutting reaction tends to draw the base against the tire.

9. In a device for slitting tire treads, the combination of a base adapted to rest upon and substantially conform to the shape of a portion of the tread of a pneumatic tire, a track extending from the base, a carriage slidable on the track, and a knife blade secured to each side of the carriage and projecting beyond the tire engaging surface of the base.

10. In a device for slitting tire treads, the combination of a base adapted to rest upon and substantially conforming to the shape of a portion of the tread of a pneumatic tire, a transverse track having a curvature of a lesser radius than the transverse curvature of the base, a carriage slidable on the track, and a knife blade secured to the carriage and extending beyond the tire engaging surface of the base.

11. In a device of the character described, the combination of a curved plate adapted to rest upon a portion of a pneumatic tire to be circumferentially cross-slitted, an arcuate track formed at one end of the plate, a hand operative carriage slidable along the track, a knife blade adjustably secured to the carriage and having its cutting edge projecting below the resting surface of the plate, and guide means extending downwardly from the plate and substantially at right angles to the arcuate track.

12. In a device for slitting tire treads, the combination of a curved plate adapted to rest upon a portion of a pneumatic tire, an arcuate track formed at one end of the plate, guide means extending downwardly from the plate and substantially at right angles to the arcuate track, a carriage slidable on the track, a knife blade secured to the carriage and extending downwardly therefrom, and an indicator supported by the guide means in adjustably movable relation circumferentially of a tire on which the device is mounted.

13. In a device for slitting tire treads, the combination of a base adapted to rest upon and substantially conforming to the curvature of a portion of the tread of a pneumatic tire, a track carried by the base, a carriage slidable on the track, a knife carried by the carriage and projecting beyond the tire engaging surface of the base, and an indicator carried by the device for determining the positioning of the device along a tire tread.

14. In a device for slitting tire treads, the combination of a base adapted to rest upon and substantially conforming to the curvature of a portion of the tread of a pneumatic tire, a track carried by the base, a carriage slidable on the track, a knife carried by the carriage and projecting beyond the tire engaging surface of the base, and an indicator and complementary marking indicia carried by the device for determining the positioning of the device along a tire tread.

ERNST EGER.